(12) United States Patent
Taguchi

(10) Patent No.: US 7,430,702 B2
(45) Date of Patent: Sep. 30, 2008

(54) DATA RECORDING/REPRODUCING APPARATUS AND DATA RECORDING/REPRODUCING METHOD

(75) Inventor: Masakazu Taguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 418 days.

(21) Appl. No.: 11/041,248

(22) Filed: Jan. 25, 2005

(65) Prior Publication Data

US 2005/0204257 A1   Sep. 15, 2005

Related U.S. Application Data

(63) Continuation of application No. PCT/JP02/12529, filed on Nov. 29, 2002.

(51) Int. Cl.
  *H03M 13/00* (2006.01)
  *H03M 13/03* (2006.01)
(52) U.S. Cl. .................. 714/769; 714/755; 714/794
(58) Field of Classification Search ............. 714/769, 714/755, 794
  See application file for complete search history.

(56) References Cited

U.S. PATENT DOCUMENTS

| | | | | |
|---|---|---|---|---|
| 4,701,815 A | * | 10/1987 | Yada et al. | 360/77.06 |
| 6,058,084 A | * | 5/2000 | Yamamoto et al. | 360/51 |
| 6,112,324 A | * | 8/2000 | Howe et al. | 714/763 |
| 6,175,686 B1 | * | 1/2001 | Noda | 386/123 |
| 6,539,512 B1 | * | 3/2003 | Jeong et al. | 714/752 |
| 6,604,220 B1 | * | 8/2003 | Lee | 714/769 |
| 6,625,762 B1 | * | 9/2003 | Le Dantec | 714/701 |
| 7,159,165 B2 | * | 1/2007 | Hwang et al. | 714/769 |
| 2001/0055170 A1 | | 12/2001 | Taguchi et al. | |
| 2002/0078416 A1 | | 6/2002 | Hoshizawa et al. | |
| 2002/0157045 A1 | | 10/2002 | Hwang et al. | |

FOREIGN PATENT DOCUMENTS

| | | |
|---|---|---|
| CN | 1296668 | 5/2001 |
| EP | 1 083 662 | 3/2001 |

(Continued)

OTHER PUBLICATIONS

H. Ogiwara et al., "Turbo Coding-Connective Encoding/Iterative Decoding," Journal of The Institute of Electronics, Information and Communication Engineers, Mar. 1, 2001, vol. 84, No. 3, pp. 184-188.

(Continued)

*Primary Examiner*—Joseph D Torres
(74) *Attorney, Agent, or Firm*—Staas & Halsey LLP

(57) ABSTRACT

A data recording/reproducing method and apparatus for correcting data errors on a recording medium even with the use of a conventional ECC. The data recording/reproducing apparatus includes a generation unit that generates predetermined data units by dividing an ECC sector including error correction codes generated by an error correction encoder into prescribed data units and encoding the prescribed units into iterative encoded data units using an iterative encoder so that the predetermined data units may include the iterative-encoded data units, a recording unit, a reproducing unit, an iterative decoder for conducting iterative decoding on the predetermined data units, and an error correction decoder. The apparatus further includes a distribution unit for distributing the predetermined data units generated by the generation unit. The distribution unit distributes the iterative encoded data units using at least two ECC sectors and records the distributed data units on a recording medium.

20 Claims, 18 Drawing Sheets

FOREIGN PATENT DOCUMENTS

| | | |
|---|---|---|
| JP | 9-153259 | 6/1997 |
| JP | 10-188489 | 7/1998 |
| JP | 2000-57700 | 2/2000 |
| JP | 2000-182332 | 6/2000 |
| JP | 2001-093234 | 4/2001 |
| JP | 2001-101806 | 4/2001 |
| JP | 2001169243 | 6/2001 |
| JP | 2002-008325 | 1/2002 |
| JP | 2002-015530 | 1/2002 |
| JP | 2002-245726 | 8/2002 |
| WO | WO 00/36595 | 6/2000 |

OTHER PUBLICATIONS

Japanese Patent Office Action, mailed Feb. 27, 2007, and issued in corresponding Japanese Patent Application No. 2004-556776.

Chinese Patent Office Action, mailed on Jun. 29, 2007 and issued in corresponding Chinese Patent Application No. 028294688.

European Search Report dated Mar. 19, 2008 for corresponding European Patent Application No. 02785986.7-1247.

* cited by examiner

DATA RECORDING/REPRODUCING APPARATUS AND DATA RECORDING/REPRODUCING METHOD

CROSS REFERENCE TO RELATED APPLICATIONS

This application is a U.S. continuation application filed under 35 USC 111 (a) claiming benefit under 35 USC 120 and 365 (c) of PCT application JP2002/012529, filed Nov. 29, 2002, the contents of which are incorporated herein by reference in its entirety.

BACKGROUND OF THE INVENTION

1. Field of the Invention

The present invention relates generally to a data format for data being recorded on a recording medium, a data recording/reproducing apparatus, and a data recording/reproducing method. The present invention particularly relates to a data format for realizing effective error correction for errors that occur due to dust and/or scratches, for example, on the recording medium.

2. Description of the Related Art

Various types of data recording/reproducing apparatuses exist including those for recording data on a recording medium such as a magnetic disk, a magnetic tape, an optical disk, and a magneto-optical disk. To record data on these recording media, a magnetic recording mark is usually used. These recording media are less expensive than semiconductor memory and are able to store data on a permanent basis. Also, these recording media are widely used as information recording media for computers to handle large amounts of information such as images and image information. It is desired that a recording/reproducing apparatus for recording data on such recording media be able to operate with high reliability and effectively correct data errors occurring as a result of dust and scratches on the recording media.

FIG. 1 is a diagram illustrating ECC (error correcting code) sectors, their respective data formats, and a corresponding recording data sequence according to a conventional scheme. As is shown in part (A) of FIG. 1, the recording data includes plural ECC sectors, ECC sector 0 (100), ECC sector 1 (110), ECC sector 2n−1 (120), and ECC sector 2n (130). As is shown in part (B) of FIG. 1, each ECC sector is further divided into plural data blocks. For example, the ECC sector 0 (100) includes data 0/0 (101), data 0/1 (102), and data 0/15 (103) as data blocks. Each data block includes header information that indicates the head of the data block and data contents.

A data recording/reproducing apparatus uses an error correcting code (ECC) to accurately restore data recorded on a recording medium. When the data recording/reproducing apparatus reproduces data of a recording medium, the data reproduced from the recording medium may be erred or parts of the data may be skipped due to influence of dust and scratches, for example, on the recording medium. Accordingly, redundancy data are added to the original recording data so that data may be accurately reproduced from the recording medium even when such data error occurs, and the redundancy data are used to correct errors and inadequacies upon relaying the data.

As the ECC format, the parity code and the CRC code are known. Also, the Reed-Solomon code is known as a representative format for the ECC. Any of these ECC formats may be used to encode data recorded on a recording medium to generate an ECC sector therefrom. In other words, an ECC sector corresponds to a group of data that are encoded by an error correcting code. Further, an ECC sector such as the ECC sector ECC 0 (100) of FIG. 1 may be divided into data blocks such as data 0/0 (101), data 0/1 (102), and data 0/15 (103), for example. Each data block may be arranged to include a header at its front end portion for enabling detection of the head of the data block upon reproducing the data block.

The data blocks divided in the above-described manner may then be recorded on a recording medium. The recording data sequence shown in part (C) of FIG. 1 indicates the order in which the divided data blocks of the ECC sectors are to be recorded. As is shown in this drawing, the data sequence is recorded according to the order in which the divided data blocks are arranged.

In the following, the data recording/reproducing apparatus that conducts such an operation is described. FIG. 2 is a block diagram showing an exemplary configuration of a data recording/reproducing apparatus. The data recording/reproducing apparatus 200 of FIG. 2 includes an ECC encoder 201, a modulator 202, a recording circuit 203, a recording medium 204, a reproducing circuit 205, a demodulator 206, and an ECC decoder 207.

In the case of recording data on the recording medium 204, first, recording data 210 that are to be recorded on the recording medium 204 are supplied to the ECC encoder 201. At the ECC encoder 201, data may be encoded and divided into data blocks in the manner described above. Then, the data divided into data blocks are transmitted to the modulator 202.

At the modulator 202, the divided data are modulated into a modulation code that is suited for the present recording/reproducing system implementing the recording medium 204. For example, the (1, 7) RLL (run length limited) code or the EFM (eight to fourteen modulation code may be used as the modulation code in a case where the recording medium 204 corresponds to an optical disk. The modulated data obtained at the modulator 202 are then transmitted to the recording circuit 203.

The recording circuit 203 converts the modulated data into a recording signal, and supplies the recording signal to a recording head so that the modulated data may be recorded on the recording medium.

In the case of reproducing data from the recording medium 204, a reproducing signal that is detected from the recording medium 204 by a reproducing head is reproduced by the reproducing circuit 205. The reproducing signal is then transmitted to the demodulator circuit 206.

The demodulator circuit 206 demodulates the modulated code data that are modulated in the manner described above to reproduce the data blocks. The reproduced data blocks are then transmitted to the ECC decoder 207.

The ECC decoder 207 accumulates the divided data blocks to generate an ECC sector, and then corrects error data within the generated ECC sector to output decoded data 220.

Generally, recording media such as the optical disk, the magneto-optical disk, the magnetic disk, and the magnetic tape have partial defects that are created during their manufacture. Additionally, defective portions of commutative media such as optical disks and magnetic tape may increase owing to influences from dust and scratches created by mishandling of the media. As is described above, the ECC is provided in order to correct such errors occurring in the reproduced signal.

However, as technology develops for increasing the recording density of a recording medium, a dust particle or a scratch of the same size in such an advanced system may affect a larger amount of data compared to the conventional system. Thereby, dust particles and scratches of the same size in the advanced system may result in the generation of a greater number of data errors compared to the conventional system.

Data decoding using the iterative decoding scheme, which is presently gaining much attention, is an effective method for accurately decoding data in a case where the SNR (signal to noise ratio) of the signal decreases. However, in the case of decoding a reproduced signal including an error that may occur upon its reproduction due to defects in the recording medium (e.g., burst error signal), the likelihood information represented by such a burst error signal may be significantly different from the likelihood information that may be represented by the correct data. In such case, influences from the differing likelihood information may be propagated to the other correctly reproduced data through prior information obtained from a previous decoding result that is used in the data decoding. In this way, error propagation may occur, and desired effects of the iterative decoding may not be sufficiently obtained.

The above described problem may be solved by handling a data block containing the burst error as lost data in the iterative decoding process and conducting an error correction process at the ECC decoder. However, when a burst error resides over two data blocks, these two data blocks need to be handled as lost data. In such case, error correction required for the lost data may be beyond the error correction capacity of the ECC so that the required error correction may not be realized.

SUMMARY OF THE INVENTION

The present invention has been conceived in response to the one or more problems of the related art and its object is to provide a data format, a data recording/reproducing method, and a data recording/reproducing apparatus for realizing a more effective correction of data errors generated due to dust and scratches on a recording medium even when using conventional ECC.

To achieve the above object, the present invention, according to a first aspect, provides a data recording/reproducing apparatus including:

an error correction encoder configured to conduct error correction encoding on input data;

an iterative encoder configured to conduct iterative encoding on data output from the error correction encoder;

a generation unit configured to generate predetermined data units by dividing an ECC sector including an error correction code generated by the error correction encoder into prescribed data units and encoding the prescribed data units into iterative encoded data units using the iterative encoder, the predetermine data units consisting of the iterative encoded data units;

a recording unit configured to record the predetermined data units on a recording medium;

a reproducing unit configured to reproduce the predetermined data units from the recording medium;

an iterative decoder configured to conduct iterative decoding on the predetermined data units reproduced by the reproducing unit;

an error correction decoder configured to conduct error correction on data output by the iterative decoder; and a distribution unit configured to distribute the predetermined data units in units of the iterative encoded data units using at least two ECC sectors and output the distributed iterative encoded data units to the recording unit.

The present invention, according to another aspect, provides a data recording/reproducing apparatus, including:

an error correction encoder configured to conduct error correction encoding on input data;

a generation unit configured to generate predetermined data units by dividing an ECC sector including an error correction code generated by the error correction encoder into the predetermined data units;

a recording unit configured to record the predetermined data units generated by the generation unit on a recording medium;

an error correction decoder configured to conduct error correction on data reproduced from the recording medium; and a distribution unit configured to distribute the predetermined data units generated by the generation unit using at least two ECC sectors, and output the distributed predetermined data units to the recording unit.

According to a preferred embodiment of the present invention, the predetermined data units of the same ECC sector are distributed in a non-consecutive order.

According to another preferred embodiment, a data recording/reproducing apparatus of the present invention includes a memory having a data capacity for accommodating at least an amount of data of an ECC sector to be distributed.

According to another preferred embodiment of the present invention, the predetermined data units are distributed by interchanging positions of odd numbered predetermined data units of an ECC sector with positions of odd numbered predetermined data units of another ECC sector.

According to another preferred embodiment of the present invention, the predetermined data units are distributed by interchanging positions of odd numbered predetermined data units of an ECC sector with positions of even numbered predetermined data units of another ECC sector.

According to another preferred embodiment of the present invention, the recording unit and the reproducing unit are configured to record or reproduce at least two of the predetermined data units simultaneously, and distribute the predetermined data units of at least two ECC sectors.

According to another preferred embodiment of the present invention, the recording unit and the reproducing unit are configured to record or reproduce at least two of the predetermined data units simultaneously, and distribute the predetermined data units of at least two ECC sectors.

According to another preferred embodiment, a data recording/reproducing apparatus of the present invention includes a data buffer configured to monitor continuity of the input data.

According to another preferred embodiment of the present invention, when the data buffer determines that the input data continue over a data amount that is greater than or equal to a data amount for two ECC sectors, data of the two ECC sectors are distributed and recorded on the recording medium.

According to another preferred embodiment of the present invention, when the data buffer determines that the input data continue over a data amount that is less than or equal to the data amount for a single ECC sector, data of the single ECC sector and recorded data or dummy data are distributed and recorded.

According to another preferred embodiment of the present invention, a file allocation table is referred to for determining whether unrecorded sectors for recording data of two ECC sectors are available within the recording medium.

According to another preferred embodiment of the present invention, when the unrecorded sectors for recording data of two ECC sectors are available, data of the ECC sector generated by the input data and dummy data are used to realize the distribution.

According to another preferred embodiment of the present invention, when an unrecorded sector for recording data of one ECC sector is available in the recording medium, data of one sector recorded on the recording medium are reproduced, and the reproduced data of this one sector and data of another ECC sector generated by the input data are distributed and recorded on the recording medium.

According to another preferred embodiment, a data recording/reproducing apparatus of the present invention includes a burst error detector.

According to another preferred embodiment of the present invention, when a burst error is detected by the burst error detector, the error correction decoder processes data reproduced from the recording medium corresponding to the burst error as lost data.

According to another preferred embodiment of the present invention, the iterative encoder assigns parity codes to the iterative encoded data units, and the iterative decoder uses the parity codes to determine whether the iterative encoded data units that are reproduced from the recording medium correspond to lost data.

According to another preferred embodiment of the present invention, the distribution is realized using at least three ECC sectors.

According to another preferred embodiment of the present invention, the predetermined data units are distributed and recorded on differing tracks of the recording medium.

According to another preferred embodiment of the present invention, the predetermined data units are distributed and recorded on a fore side and a rear side of the recording medium.

The present invention, according to another aspect, provides a data recording/reproducing method, including:

an error correction encoding step of conducting error correction encoding on input data;

an iterative encoding step of conducting iterative encoding on data output from the error correction encoding step;

a generation step of generating predetermined data units through dividing an ECC sector including an error correction code generated in the error correction encoding step into prescribed data units and encoding the prescribed data units into iterative encoded data units in the iterative encoding step, the predetermined data units consisting of the iterative encoded data units;

a recording step of recording the predetermined data units on a recording medium;

a reproducing step of reproducing the predetermined data units from the recording medium;

an iterative decoding step of conducting iterative decoding on the reproduced predetermined data units;

an error correction decoding step of conducting error correction on data output by the iterative decoding step; and a distribution step of distributing the predetermined data units in units of the iterative encoded data units using at least two ECC sectors and outputting the distributed iterative encoded data units to the recording step.

The present invention, according to another aspect, provides a data recording/reproducing method including:

an error correction encoding step of conducting error correction encoding on input data;

a generation step of generating predetermined data units by dividing an ECC sector including an error correction code generated in the error correction encoding step into the predetermined data units;

a recording step of recording the predetermined data units generated in the generation step on a recording medium;

an error correction decoding step of conducting error correction on data reproduced from the recording medium; and a distribution step of distributing the predetermined data units using at least two ECC sectors and outputting the distributed predetermined data units to the recording step.

According to an aspect of the present invention, the positions of data blocks (data units) into which one ECC sector is divided are interchanged with the positions of the data blocks of another ECC sector to realize data distribution recording. Upon reproducing data recorded on a recording medium, there may be cases in which a long burst error spanning plural data blocks of an ECC sector occurs owing to the presence of dust or scratches on the recording medium. In such case, in a conventional system, the burst error may be beyond the error correction capacity of the ECC, and error correction may not be effectively realized. However, data recorded using a format according to an embodiment of the present invention are arranged such that data blocks are distributed over plural ECC sectors, and thereby, a burst error originating from defects at the recording medium may be take the form of short errors scattered over plural ECC sectors.

Thus, according to an aspect of the present invention, longer burst errors may be corrected compared to the conventional system and high density data recording/reproduction may be realized.

Also, it is noted that in systems using iterative decoding, when a burst error occurs, such data are generally handled as lost data. According to an aspect of the present invention, the data blocks may be distributed over plural ECC sectors upon data recording so that the number of data units (blocks) that may be handled as lost data may be increased and error correction may be accurately realized for longer burst errors compared to the convention system. By incorporating one or more features of the present invention with iterative decoding, high density data recording/reproduction may be effectively realized.

DESCRIPTION OF THE PREFERRED EMBODIMENTS

In the following, preferred embodiments of the present invention are described with reference to the accompanying drawings.

Figure 3:
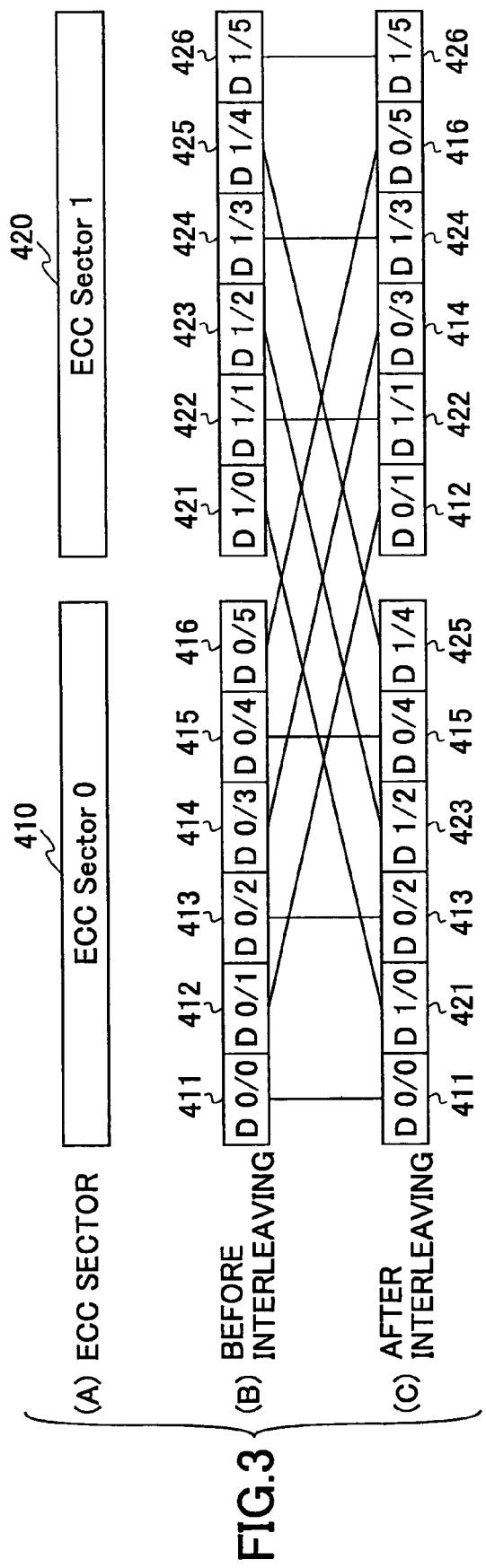
FIG. 3 is a diagram illustrating a data distribution scheme according to a first embodiment of the present invention (odd/even interchanging scheme)

FIG. 3 is a diagram illustrating a data distribution scheme according to a first embodiment of the present invention. Specifically, this drawing illustrates a data interleaving or distributing method conducted by a data recording/reproducing apparatus in which the positions of even numbered data blocks of one ECC sector and odd numbered data blocks of another ECC sector are interchanged.

In the example of FIG. 3, the positions of odd numbered data blocks of ECC sector 0 (410) and even numbered data blocks of ECC sector 1 (420) are interchanged. That is, the ECC sector 0 (410) of the ECC sectors shown in part (A) of FIG. 3 includes data blocks D 0/0 (411), D 0/1 (412), D 0/2 (413), D 0/3 (414), D 0/4 (415), and D 0/5 (416) before an interleaving process as is shown in part (B) of FIG. 3. The ECC sector 1 (420) of the ECC sectors shown in part (A) of FIG. 3 includes data blocks D 1/0 (421), D 1/1 (422), D 1/2 (423), D 1/3 (424), D 1/4 (425), and D 1/5 (426) before the interleaving process.

Upon performing the interleaving process, the positions of the odd numbered data blocks D 0/1 (412), D 0/3 (414), and D 0/5 (416) and the even numbered data blocks D 1/0 (421), D 1/2 (423), and D 1/4 (425) are interchanged. As a result, as is shown in part (C) of FIG. 3, data blocks of differing ECC sectors are sequentially recorded on the recording medium, namely, the data blocks are recorded in the following sequence: D 0/0 (411), D 1/0 (421), D 0/2 (413), D 1/2 (423), D 0/4 (415), D 1/4 (425), D 0/1 (412), D 1/1 (422), D 0/3 (414), D 1/3 (424), D 0/5 (416), and D 1/5 (426).

By distributing the data blocks over two ECC frames upon recording the data blocks on the recording medium, even when a data error such as a burst error occurs, the data blocks sustaining the error in the original ECC frame may be distributed and the ECC may be combined to realize error correction.

Figure 4:
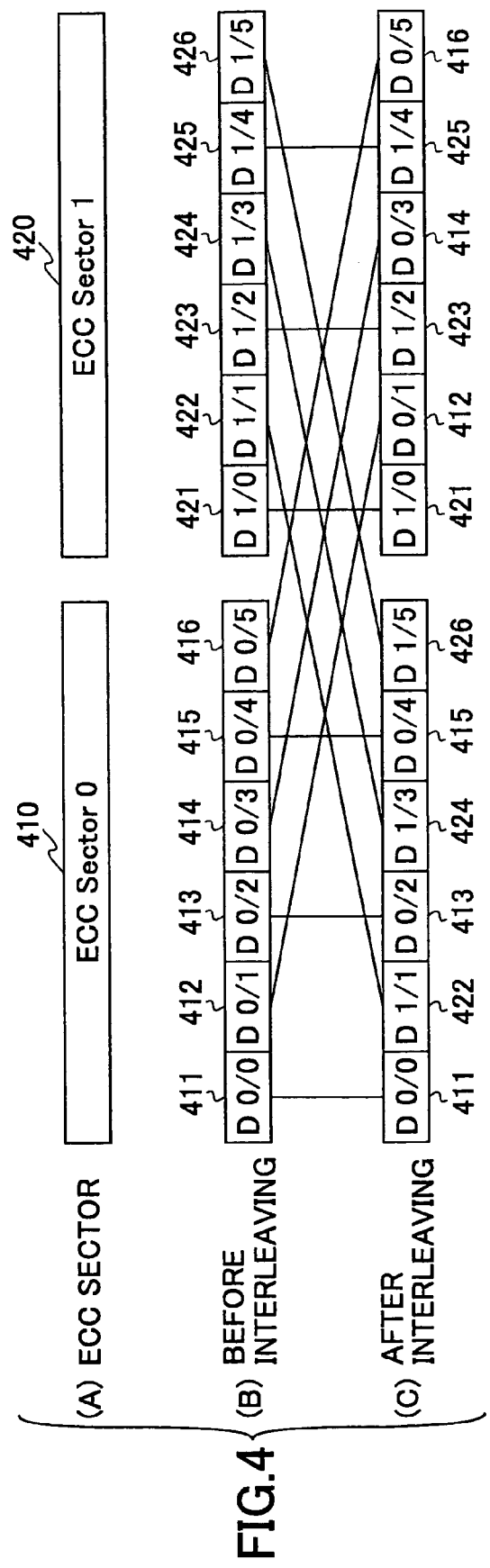
FIG. 4 is a diagram illustrating a data distribution scheme according to a second embodiment of the present invention (odd/odd interchanging scheme)

FIG. 4 illustrates a data distribution scheme according to a second embodiment of the present invention. This drawing illustrates a data interleaving method that is conducted by a data recording/reproducing apparatus in which the positions of odd numbered data blocks of one ECC sector and odd numbered data blocks of another ECC sector are interchanged. It is noted that elements shown in the present drawing that are identical to those shown in FIG. 3 are given the same numerical references.

In the example of FIG. 4, the positions of odd numbered data blocks of ECC sector 0 (410) and odd numbered data blocks of ECC sector 1 (420) are interchanged. That is, the ECC sector 0 (410) of the ECC sectors shown in part (A) of FIG. 4 includes data blocks D 0/0 (411), D 0/1 (412), D 0/2 (413), D 0/3 (414), D 0/4 (415), and D 0/5 (416) before an interleaving process as is shown in part (B) of FIG. 4. The ECC sector 1 (420) of the ECC sectors shown in part (A) of FIG. 4 includes data blocks D 1/0 (421), D 1/1 (422), D 1/2 (423), D 1/3 (424), D 1/4 (425), and D 1/5 (426) before the interleaving process.

Upon performing the interleaving process, the positions of the odd numbered data blocks D 0/1 (412), D 0/3 (414), and D 0/5 (416) of ECC sector 0 (410) and the odd numbered data blocks D 1/1 (422), D 1/3 (424), and D 1/5 (426) of ECC sector 1 (420) are interchanged. As a result, as is shown in part (C) of FIG. 3, after the interleaving process, the data blocks of the differing ECC sectors are sequentially recorded on the recording medium, namely, the data blocks are recorded in the following sequence: D 0/0 (411), D 1/1 (422), D 0/2 (413), D 1/3 (424) D 0/4 (415), D 1/5 (426), D 1/0 (421), D 0/1 (412), D 1/2 (423), D 0/3 (414), D 1/4 (425), and D 0/5 (416).

Figure 1:
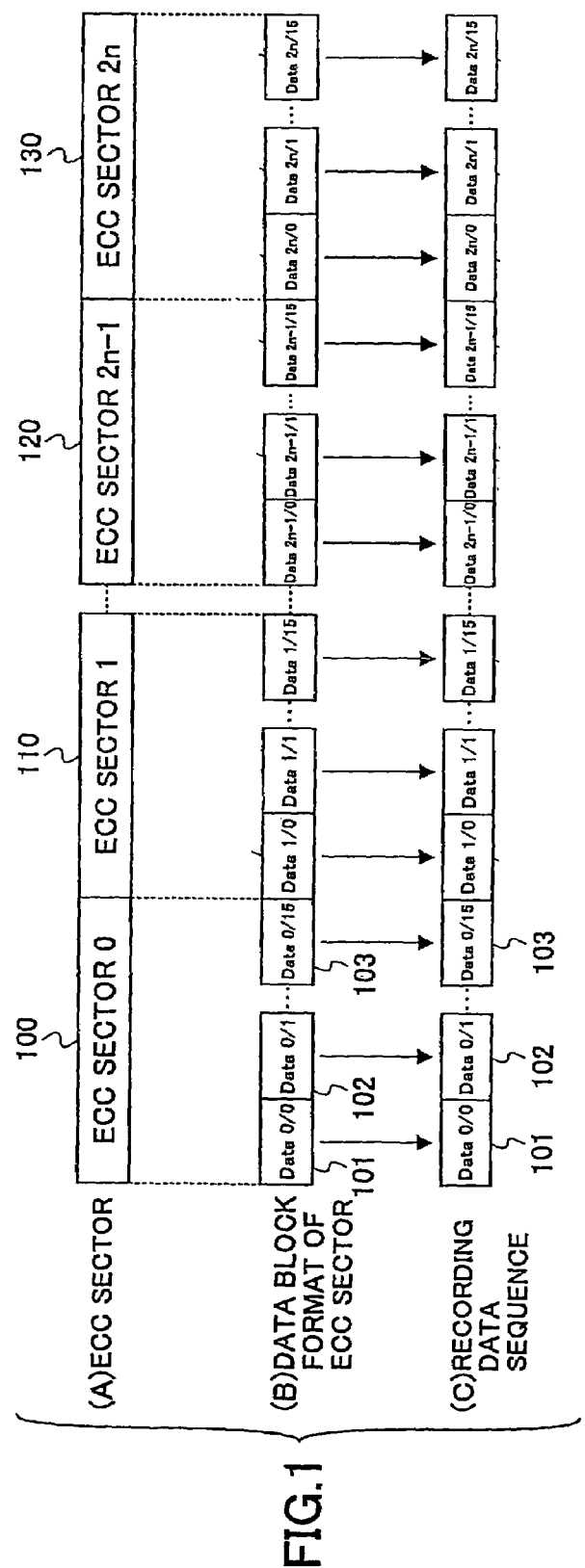
FIG. 1 is a diagram illustrating ECC sectors, their respective data formats, and a corresponding recording data sequence according to a conventional scheme.
Figure 2:
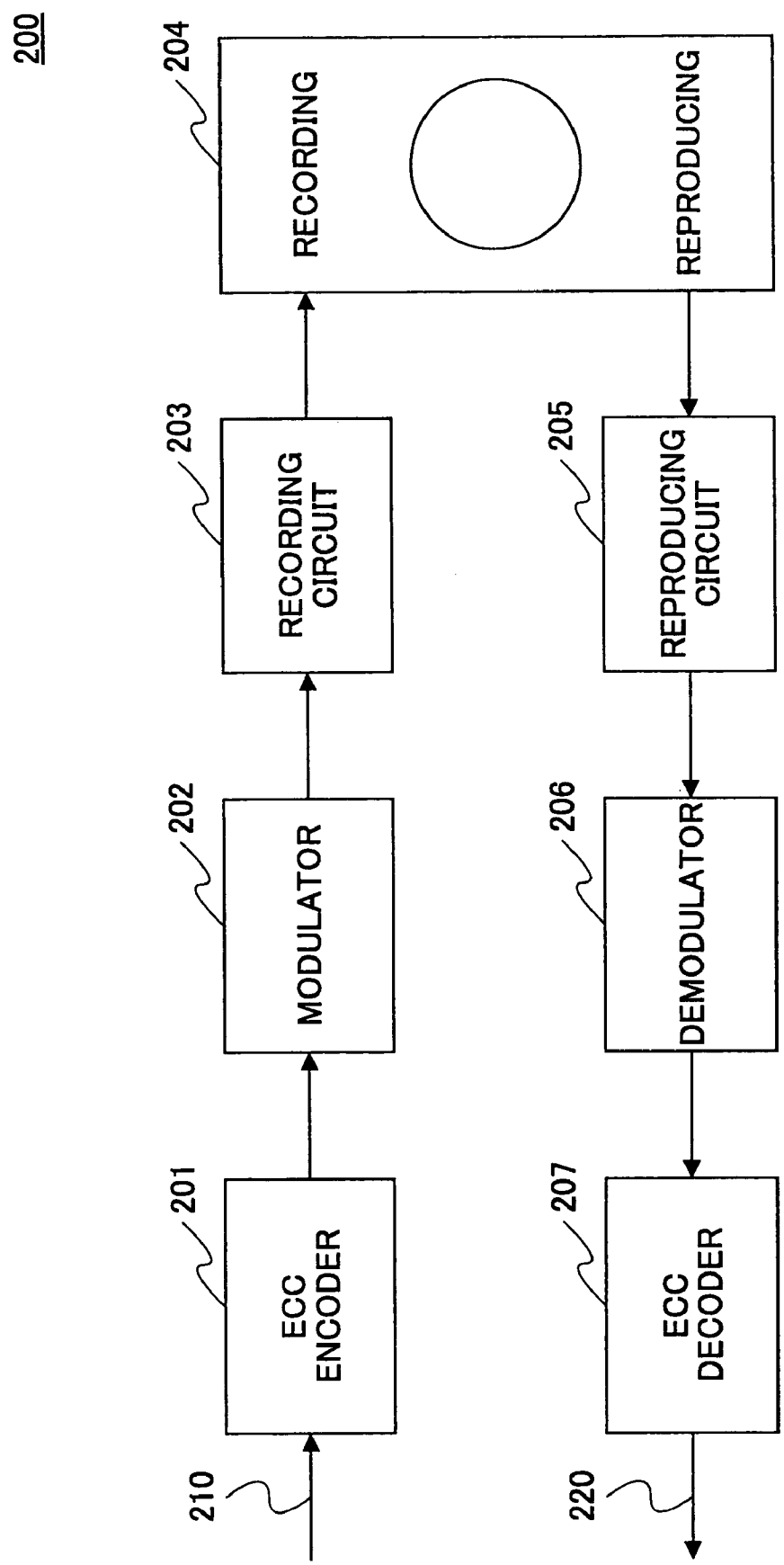
FIG. 2 is a block diagram showing an exemplary configuration of a data recording/reproducing apparatus.
Figure 5:
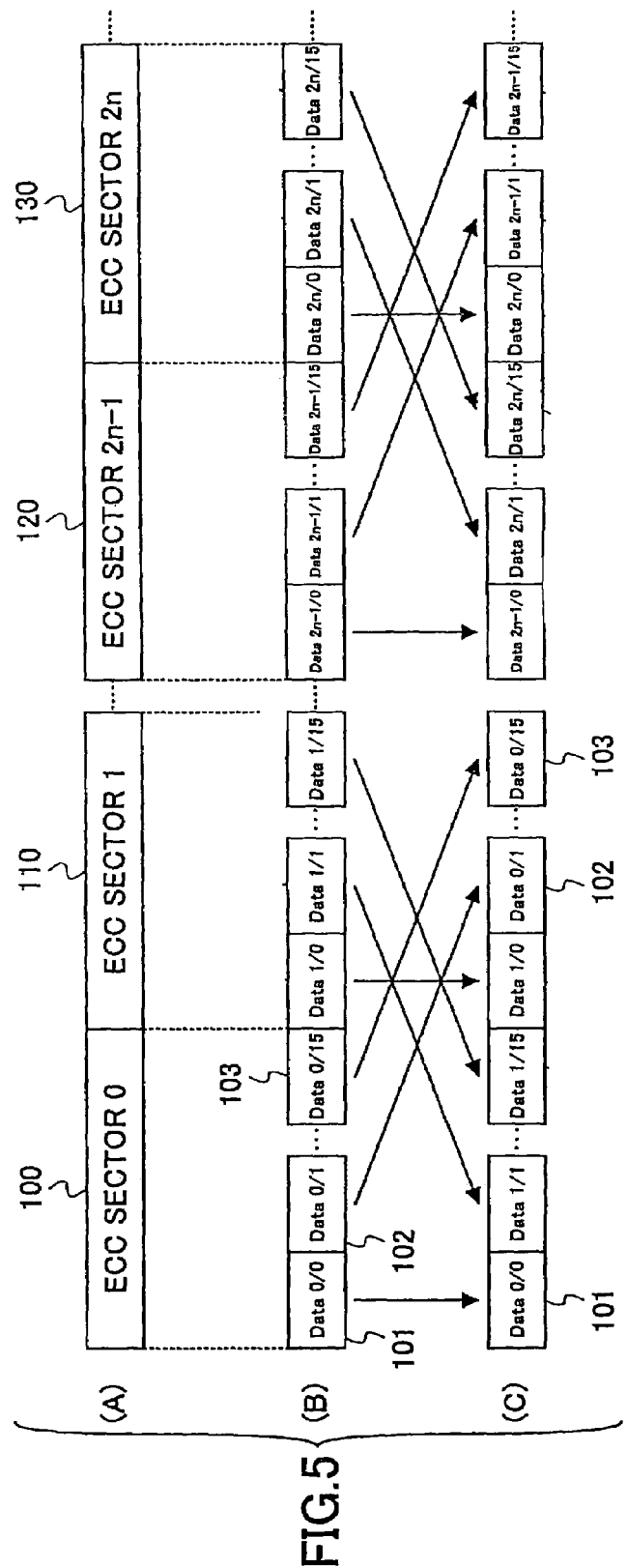
FIG. 5 is a diagram showing an exemplary case of implementing the data distribution scheme of the second embodiment.

FIG. 5 illustrates an exemplary data format implementing the data distribution scheme of the second embodiment. In the example of FIG. 5, the data distribution scheme according to the second embodiment of interchanging the positions of odd numbered data blocks of one ECC sector and odd numbered data blocks of another ECC sector is applied to the ECC sectors shown in part (A) and the data block formats of the ECC sectors shown in part (B) that are identical to the ECC sectors and data block formats shown in FIG. 1 to generate a recording data sequence as is shown in part (C) of FIG. 5. In the recording data sequence shown in part (C) of this drawing, the odd numbered data blocks such as data 0/1 (102) of the ECC sector 0 (100) and the odd numbered data blocks such as data 1/1 (112) of the ECC sector 1 (110) are interchanged. In this way the recording order of the data blocks may be changed with respect to the recording data sequence shown in part (C) of FIG. 1.

By distributing the data blocks of an ECC sector over two ECC frames upon recording the data blocks on a recording medium, even when a data error such as a burst error occurs, data blocks that sustain the error in the original frame may be distributed and the ECC may be combined to realize error correction.

According to the above-described example using the second embodiment, the interleaving process conducted by the data recording/reproducing apparatus involves interchanging the positions of the odd numbered data blocks of an ECC sector and the odd numbered data blocks of another ECC sector. However, the interleaving process may also be realized by interchanging the positions of even numbered data blocks of an ECC sector and even numbered data blocks of another ECC sector.

Figure 6:
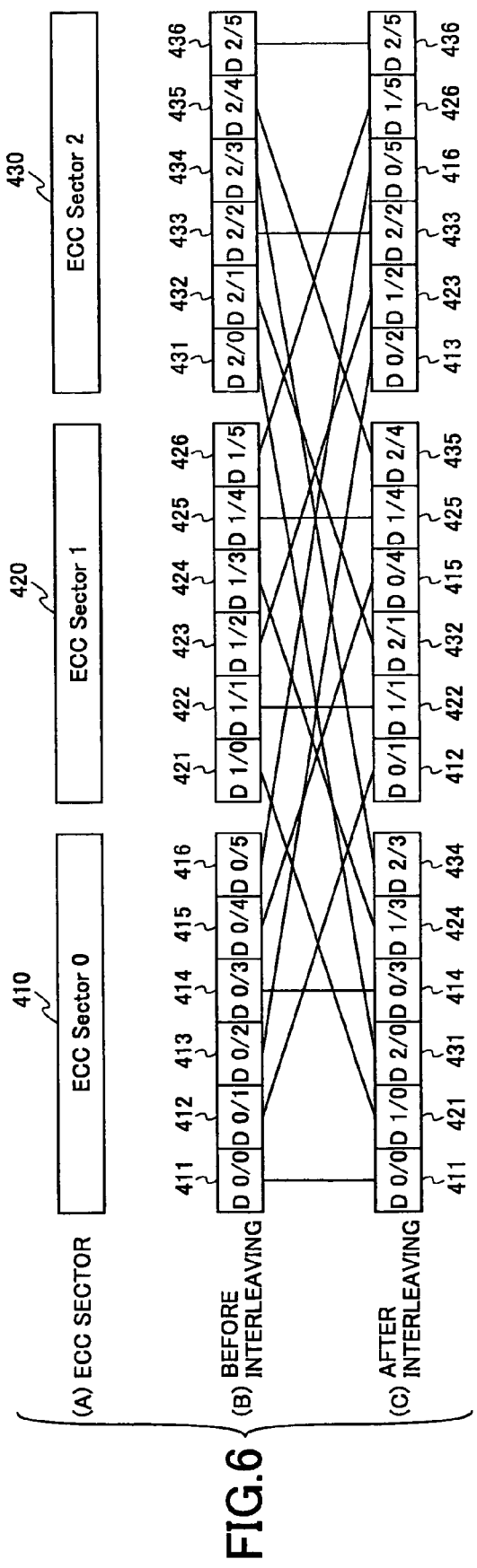
FIG. 6 is a diagram illustrating a data distribution scheme according to a third embodiment of the present invention (three sector scheme)

FIG. 6 is a diagram illustrating a data distribution scheme (three sector scheme) according to a third embodiment of the present invention. The present embodiment involves interchanging the positions of data blocks of three differing ECC sectors so that the data blocks of each ECC sector may be distributed over the three ECC frames. It is noted that elements shown in FIG. 6 that are identical to those shown in FIG. 3 are given the same numerical references.

In the present example, the ECC sector 0 (410) of the ECC sectors shown in part (A) of FIG. 6 includes data blocks D 0/0 (411), D 0/1 (412), D 0/2 (413), D 0/3 (414), D 0/4 (415), and D 0/5 (416) before an interleaving process as is shown in part (B) of FIG. 6. The ECC sector 1 (420) of the ECC sectors shown in part (A) of FIG. 6 includes data blocks D 1/0 (421), D 1/1 (422), D 1/2 (423), D 1/3 (424), D 1/4 (425), and D 1/5 (426) before the interleaving process. Also, ECC sector 2 (430) of the ECC sectors shown in part (A) of FIG. 6 includes data blocks D 2/0 (431), D 2/1 (432), D 2/2 (433), D 2/3 (434), D 2/4 (435), and D 2/5 (436) before the interleaving process.

Upon performing the interleaving process in the present example, the $0^{th}$ data block D 0/0 (411) of the ECC sector 0 (410), the $0^{th}$ data block D 1/0 (421) of the ECC sector 1 (420), and the $0^{th}$ data block D 2/0 (431) of the ECC sector 2 (430) are gathered together. Then, the $3^{rd}$ data block D 0/3 (414) of the ECC sector 0 (410), the $3^{rd}$ data block D 1/3 (424) of the ECC sector 1 (420), and the $3^{rd}$ data block D 2/3 (434) of the ECC sector 2 (430) are gathered together. Consequently, after the interleaving process, the data blocks to be recorded are arranged in the following sequence: D 0/0 (411), D 1/0 (421), D 2/0 (431), D 0/3 (414), D 1/3 (424), D 2/3 (434), and so on, as is shown in part (C) of FIG. 6.

Figure 7:
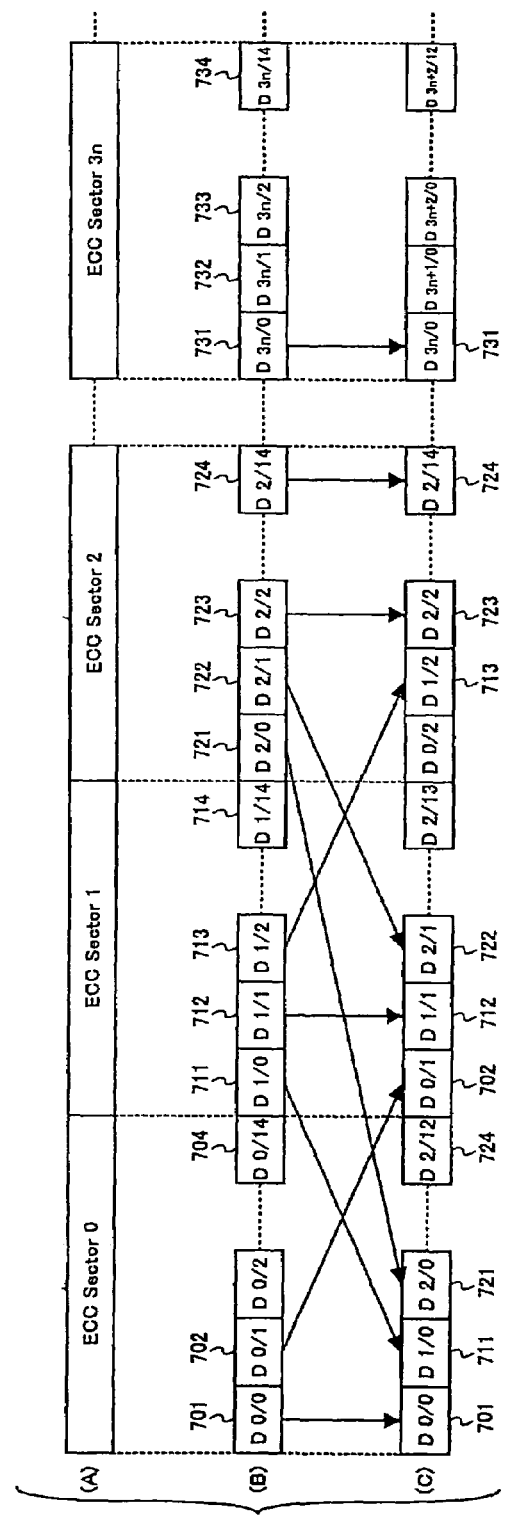
FIG. 7 is a diagram showing an exemplary case of implementing the data distribution scheme of the third embodiment.

FIG. 7 is a diagram illustrating an exemplary data format implementing the data distribution scheme of the third embodiment. It is noted that part (A) of FIG. 7 represents ECC sectors of encoded data, part (B) represents data block formats of the ECC sectors, and part (C) represents a recording data sequence. The recording data sequence of FIG. 7 is arranged according to the data distribution scheme of the third embodiment in which data blocks are successively extracted from the ECC sector 0, the ECC sector 1, and the ECC sector 2, respectively, and rearranged into a predetermined sequence: D 0/0 (701), D 1/0 (711), D 2/0 (721), . . . , D 2/12 (724), D 0/1 (702), D 1/1 (712), D 2/1 (722), . . . , and so on.

By distributing the data blocks over three ECC frames upon recording the data blocks on the recording medium as is illustrated in the above example, even when a data error such as a burst error occurs, data blocks that sustain the error in the original ECC frame may be distributed, and the ECC may be combined to realize error correction.

It is noted that in the above described example implementing the third embodiment, data blocks of an ECC sector are distributed over three ECC frames. However, the present embodiment is not limited to this example, and the data blocks may also be distributed over more than three ECC sectors.

Figure 8:
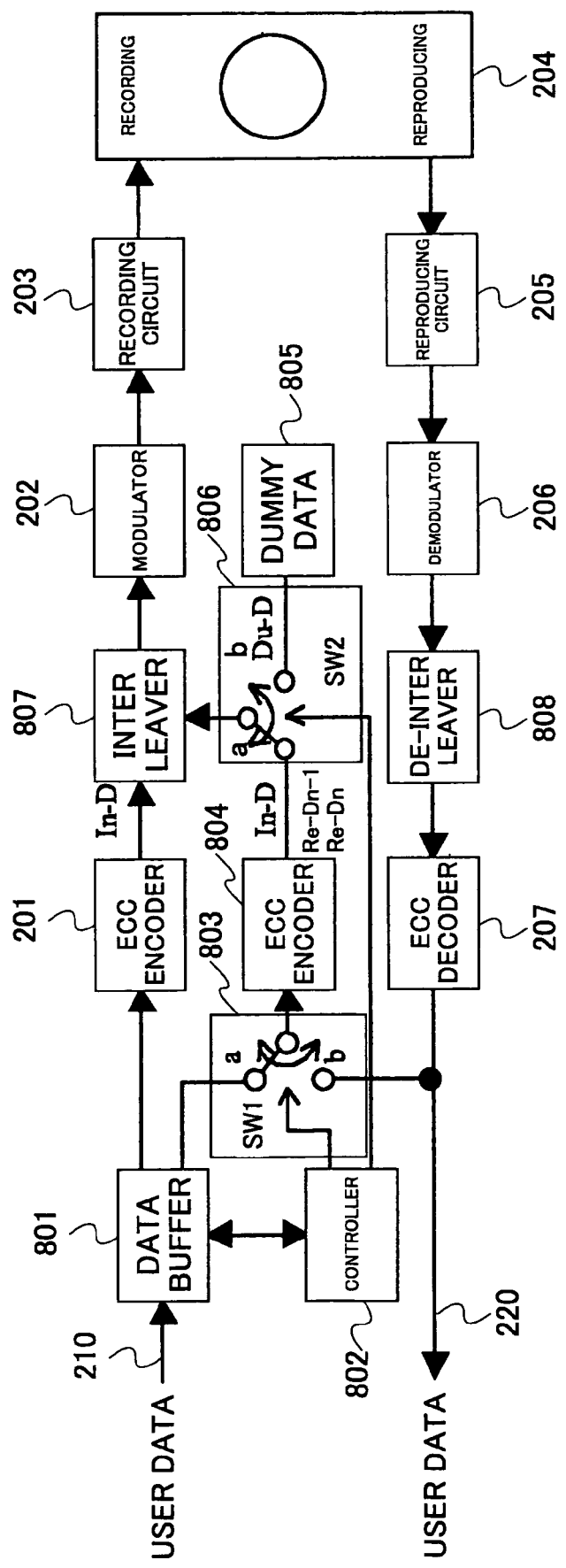
FIG. 8 is a block diagram showing a configuration of a data recording/reproducing apparatus for realizing distribution recording according to a fourth embodiment of the present invention.
Figure 9:
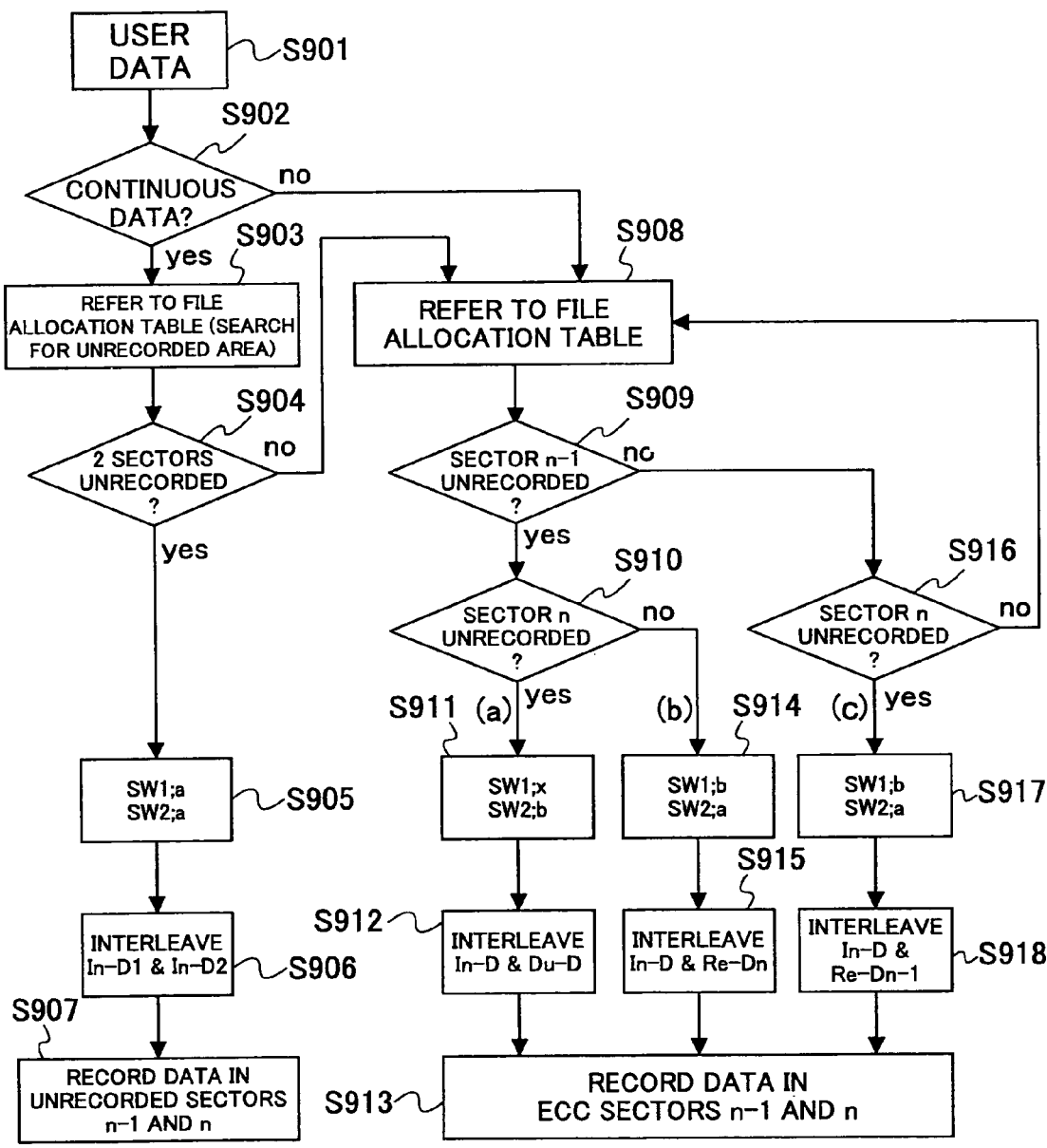
FIG. 9 is a flowchart illustrating an exemplary operation of the data recording/reproducing apparatus of the fourth embodiment for realizing distribution recording.

FIG. 8 is a diagram illustrating a configuration of a data recording/reproducing apparatus for realizing data distribution recording according to a fourth embodiment of the present invention. FIG. 9 is a flowchart illustrating an operation of the data recording/reproducing apparatus of the fourth embodiment for realizing the data distribution recording.

The data recording/reproducing apparatus of the fourth embodiment as is shown in FIG. 8 for realizing data distribution recording includes an ECC encoder 201, a modulator 202, a recording circuit 203, a recording medium 204, a reproducing circuit 205, a demodulator 206, an ECC demodulator 207, a data buffer 801, a controller 802, a first switch 803, an ECC encoder 804, a dummy data generator 805, a second switch 806, an interleaver 807, and a de-interleaver 808.

In the following, the operation of the data recording/reproducing apparatus of FIG. 8 is described with reference to FIGS. 8 and 9.

In step S901 of FIG. 9, the data recording/reproducing apparatus of FIG. 8 acquires user data 210 that are divided into recording units according to a logical format (e.g., 2 KB or 32 KB according to the data size supported by the operating system (OS)), the data being supplied to the data buffer 801 from a superordinate apparatus such as a personal computer via an interface provided between the superordinate apparatus and the data recording/reproducing apparatus. Generally, ECC encoding/decoding is conducted in units of the data size into which the supplied user data 210 are divided.

Then, in step S902, the supplied user data 210 are taken in by the data buffer 801 while monitoring the data size thereof. Specifically, the controller 802 monitors the data size to determine whether the supplied data may need to use two or more ECC sectors, and controls the first switch according to the determination result. If the supplied data continue over two or more EC sectors, the operation proceeds to step S903.

In step S903, a file allocation table that is recorded at a predetermined location of the recording medium is referred to in order to find an area in which data extending over two ECC sectors may be recorded.

Then, in step S904, a determination is made as to whether an unrecorded area that may store two ECC sectors of data has been found. If such unrecorded area for storing two ECC sectors of data is found, the operation proceeds to step S905.

In step S905, positions 'a' for the first switch and the second switch, respectively, are selected by the controller 802.

In step S906, data (In-D1) of one ECC sector are ECC encoded by the ECC encoder 201, and data (In-D2) of the other ECC sector are input to the ECC encoder 804 via the first switch 803 to be ECC encoded. Then, the data (In-D1) and (In-D2) of the two ECC sectors that are ECC encoded at the ECC encoders 201 and 804, respectively, may be rearranged by the interleaver 807 according to the data distribution scheme of FIG. 3, for example, to obtain a data sequence in which data blocks of the same ECC sector may be positioned apart from one another.

Then, in step S907, data interleaved by the interleaver 807 are transmitted to the modulator 202 to be modulated by a suitable modulation code for recording and reproducing. For example, in the case of recording/reproducing data on/from an optical disk, the (1, 7) RLL code or the EFM modulation code may be used as is described above. Then, the recording circuit 203 may record the modulated data on the unrecorded area of the recording medium 204 for two ECC sectors of data that has been detected in step S904.

On the other hand, in the case of reproducing data of a predetermined ECC sector recorded on the recording medium 204 in the manner described above, the file allocation table may be referred to in order to locate the data distributed over plural locations. Then, the data recorded at the respective locations may be reproduced by the reproducing circuit 205, and the reproduced data may be modulated by the modulation circuit 206. Then, the modulated data may be rearranged back to the data sequence state prior to being interleaved or distributed by the de-interleaver 808, after which error correction may be conducted on errors included in the reproduced data by the EC decoder 207 so that the resulting data may be reproduced as user data 220.

When it is determined in step S902 that the input user data 210 does not continue over two ECC sectors, namely, only one ECC sector is required to encode the user data 210, the operation proceeds to step S908.

In step S908, the file allocation table is referred to in order to find an available recording area within the recording medium 204 for storing one ECC sector of data.

It is noted that the states of two consecutive sectors n−1 and n of the recording medium 204 may be classified into the following three categories:
(1) sector n−1 is unrecorded (recordable) and sector n is also unrecorded (recordable)
(2) sector n−1 is unrecorded (recordable) and sector n is already recorded
(3) sector n−1 is already recorded and sector n is unrecorded (recordable)

Accordingly, if it is determined in step S909 that sector n−1 is unrecorded (recordable) and it is also determined in step S910 that sector n is unrecorded (recordable) as well (corresponding to case (1)), the operation proceeds to step S911.

In step S911, the first switch may be set to any position and the second switch is set to position b.

In step S912, the data encoded at the ECC encoder 201 and dummy data generated by the dummy data generator 805 are interleaved by the interleaver 807 in the manner described above.

Then, in step S913, the data interleaved by the interleaver 807 are transmitted to the modulator 202 to be modulated by a suitable modulation code for realizing data recording/reproduction. For example, in the case of recording/reproducing data on/from an optical disk, the (1, 7) RLL code or the EFM modulation code may be used as is described above. Then, the recording circuit 203 may record the modulated data on the two sectors of the recording medium 204 that have been detected as unrecorded areas. It is noted that the dummy data may be handled as unrecorded in cases (2) and (3).

If it is determined in step S909 that sector n−1 is unrecorded (recordable) and it is determined in step S910 that sector n is already recorded (corresponding to case (2)), the operation proceeds to step S914.

In step S914, the controller 802 sets the first switch 803 to position 'b' and sets the second switch 806 to position 'a'.

Then, in step S915, data that are already recorded are reproduced by the reproducing circuit 205, demodulated by the demodulation circuit 206, de-interleaved by the de-interleaver 808, and reproduced (ECC decoded) by the ECC decoder 207. Then, the reproduced data are transmitted from the first switch 803 to the ECC encoder 804 to be ECC encoded again. Then, the encoded data are interleaved with the data encoded by the ECC encoder 201 by the interleaver 807.

Then the operation proceeds to step S913, and the interleaved data are recorded on the recording medium 204 in the manner described above.

If it is determined in step 909 that sector n−1 is already recorded and it is determined in step S916 that sector n is unrecorded (recordable) (corresponding to case (3)), the operation proceeds to step S917.

In step S917, the first switch 803 is set to position 'b' and the second switch 806 is set to position 'a'.

Then, in step S918, the already recorded data are reproduced by the reproducing circuit 205, demodulated by the demodulator 206, de-interleaved by the de-interleaver 808, and reproduced (ECC decoded) by the ECC decoder 206. Then, the reproduced data are transmitted from the first switch 803 to the ECC encoder 804 to be encoded again.

Then, the encoded data are interleaved with the data encoded at the ECC encoder 201 by the interleaver 807.

Then, the operation proceeds to step S913 where the interleaved data are recorded on the recording medium 204 in the manner described above.

If it is determined in step S916 that sector n is already recorded, the operation proceeds back to step S908 in which the file allocation table is referred to in order to find a recording area on the recording medium 204 for recording one sector of data.

Figure 10:
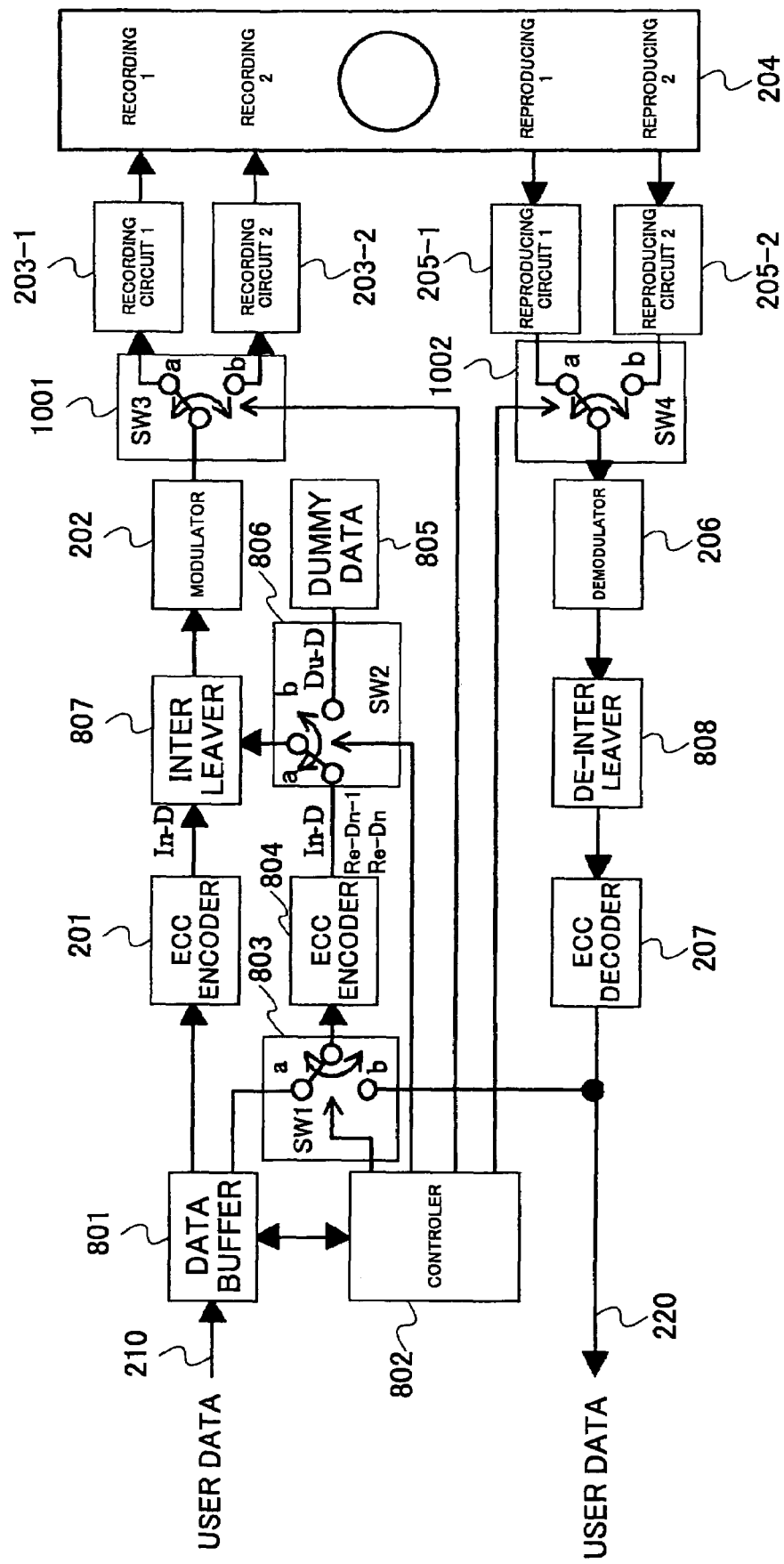
FIG. 10 is a block diagram showing a configuration of a data recording/reproducing apparatus for realizing distribution recording according to a fifth embodiment of the present invention (parallel recording/reproducing system configuration)

FIG. 10 is a block diagram illustrating a configuration of a data recording/reproducing apparatus (parallel recording system) for realizing data distribution recording according to a fifth embodiment of the present invention. It is noted that elements shown in FIG. 10 that are identical to those shown in FIG. 8 are given the same numerical references.

The data recording/reproducing apparatus of FIG. 10 for realizing data distribution recording according to the fifth embodiment includes a third switch 1001 and a fourth switch 1002 in addition to the elements included in the data recording/reproducing apparatus of FIG. 8. Further, in the data recording/reproducing apparatus according to the present embodiment, the recording circuit 203 of FIG. 8 is divided into two recording circuits 203-1 and 203-2, and the reproducing circuit 205 of FIG. 8 is divided into two reproducing circuits 205-1 and 205-2.

It is noted that generally, an optical disk apparatus implements single optical heads for recording and reproducing, respectively, since optical heads tend to be expensive. However, a configuration as described above may be realized in an optical disk apparatus. For example, plural optical heads may be provided at one side of a recording medium or at both sides of the recording medium.

In the example of FIG. 10, a recording head 1 and a reproducing head 1 are provided at the fore side surface of the recording medium 204 and a recording head 2 and a reproducing head 2 are provided at a rear side surface of the recording medium 204. In this case, a data sequence including data blocks that are distributed over plural ECC sector frames in a discontinuous arrangement is modulated into a suitable modulation code for realizing data recording and reproduction, and the third switch 1001 is controlled by the controller 802 to realize data recording on the fore side and rear side of the recording medium 204, respectively.

For example, in recording the data sequence shown in FIG. 5, the recording data sequence of data 0/0, data 1/1, . . . , data 1/15 may be recorded on the fore side of the recording medium 204 and the recording data sequence of data 1/0, data 0/1, . . . , data 0/15 may be recorded on the rear side of the recording medium 204 in a parallel manner.

As for reproducing data according to the present embodiment, reproducing heads 1 and 2 are used to reproduce data recorded on the respective sides of the recording medium 204, and the fourth switch 1002 is used to successively output the reproduced data to the demodulation circuit 206. It is noted that in the present example, the recording circuits 203-1 and 203-2 and the reproducing circuits 205-1 and 205-2 are arranged to be parallel; however, the modulator 202 and demodulator 206 may also be arranged to have parallel configurations and the recording data on the fore side of the recording medium 204 and the recording data on the rear side of the recording medium 204 may be separated at the interleaver 807 and de-interleaver 808, for example. Also, it is noted that in the example described above, the recording system and the reproducing system are each arranged into two system configurations; however, the recording system and the reproducing system may also be arranged to have three or more systems as well. Further, the optical heads of the systems may be provided at the same side of the recording to record/reproduce data on/from different tracks, for example.

Figure 11:
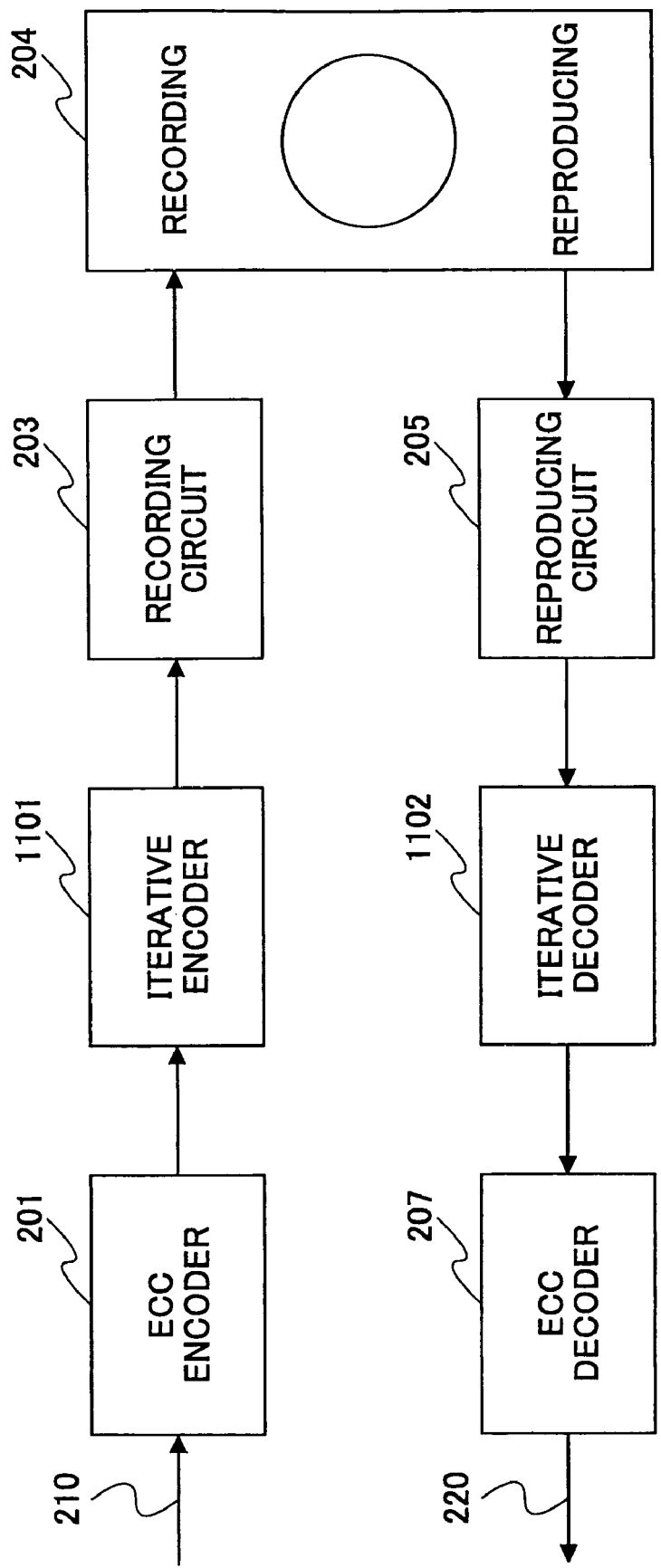
FIG. 11 is a block diagram showing an exemplary configuration of a data recording/reproducing apparatus that implements iterative decoding.

FIG. 11 shows a configuration of a data recording/reproducing apparatus that conducts iterative decoding. The data recording/reproducing apparatus of FIG. 11 includes an ECC encoder 201, an iterative encoder 1101, a recording circuit 203, a recording medium 204, a reproducing circuit 205, an iterative decoder 1102, and an ECC decoder 207.

In the data recording/reproducing apparatus as described above, data recording is realized by ECC encoding input user data 210 with the ECC encoder 210, and encoding the data again with the iterative encoder 1101 using an iterative code. Then, the data encoded by the iterative encoder 1101 may be recorded on the recording medium 204 through the recording circuit 203.

Upon encoding, the data are divided into block units (iterative block data) for conducting iterative decoding. As for the iterative code, a recursive convolution code may be used so that iterative decoding may be realized. Also, in the present example, data reproduction may be realized by decoding recorded data in block units for iterative decoding by the iterative decoder 1102, and ECC decoding the iterative decoded data by the ECC decoder 207 to reproduce user data 220.

Figure 12:
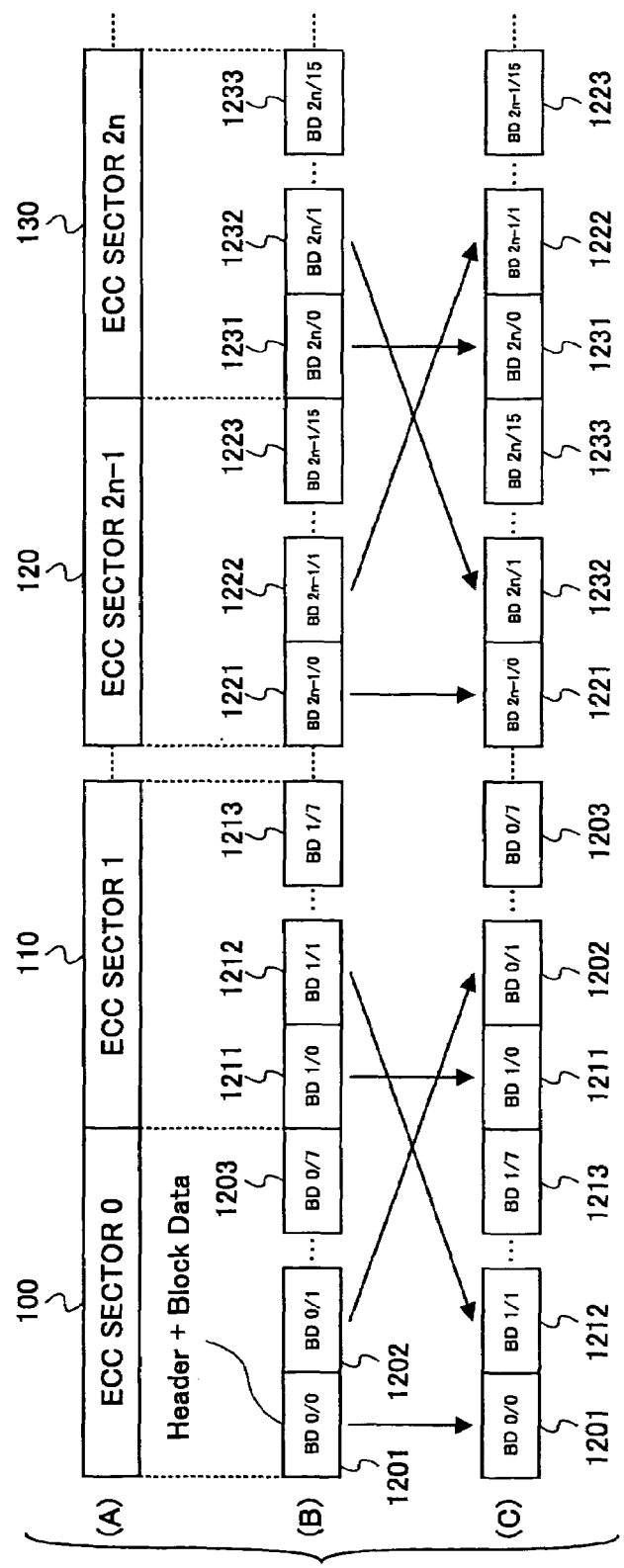
FIG. 12 is a diagram showing an exemplary case of applying a data distribution scheme of the present invention to a system implementing iterative decoding.

FIG. 12 is a diagram illustrating an exemplary case in which a data distribution scheme according to an embodiment of the present invention is applied to a system implementing iterative decoding. In the present example, the principles of the data distribution scheme of FIG. 5 are applied; however, when such a data distribution scheme is applied to iterative decoding, the data are distributed in iterative decoding block units (BD) so that data blocks of the same ECC sector of the recording medium 204 may be positioned apart from one another to realize a discontinuous arrangement of the recording data.

Figure 13:
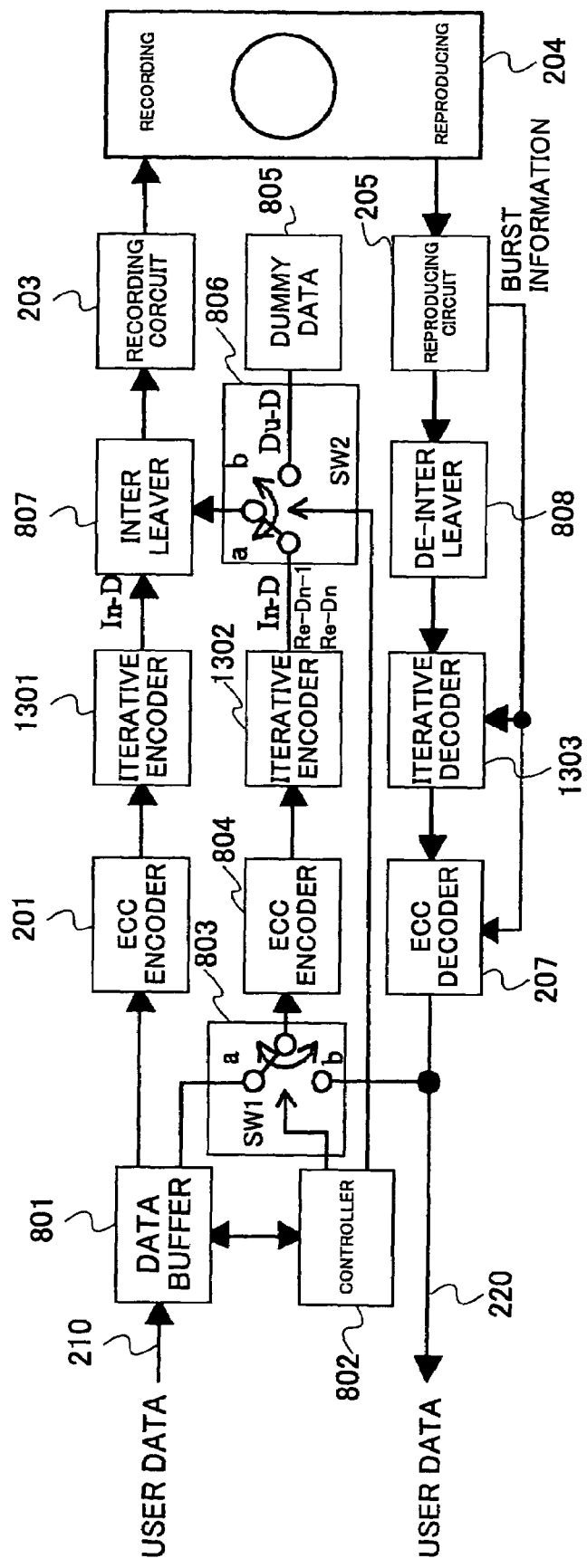
FIG. 13 is a block diagram showing a configuration of an iterative decoding recording/reproducing apparatus for realizing distribution recording according to a sixth embodiment of the present invention.

FIG. 13 is a block diagram illustrating a configuration of an iterative decoding recording/reproducing apparatus that realizes data distribution recording according to a sixth embodiment of the present invention. It is noted that elements shown in FIG. 13 that are identical to those shown in FIG. 8 are given the same numerical references. The iterative decoding recording/reproducing apparatus of FIG. 13 includes the elements shown in FIG. 8 except for the modulator 202 and the demodulator 206, and also includes iterative encoders 1301 and 1302, and an iterative decoder 1303.

The operation of the iterative decoding recording/reproducing apparatus of FIG. 13 is similar to the operation of the data recording/reproducing apparatus of FIG. 8. However, in the present embodiment, after encoding is conducted by the ECC encoders 201 and 804, further encoding is conducted by the iterative encoders 1301 and 1302 using an iterative code, after which the encoded data are interleaved by the interleaver 807 and recorded on the recording medium 204 in a manner such that data blocks of the same ECC sector may not be consecutively arranged within the same sector of the recording medium 204. To realize data reproduction in the present embodiment, a reproducing signal is transmitted to the de-interleaver 808 via the reproducing circuit 205 to be de-interleaved, after which the de-interleaved data are decoded at the iterative decoder 1303 and ECC decoded at the ECC decoder 207.

Figure 14:
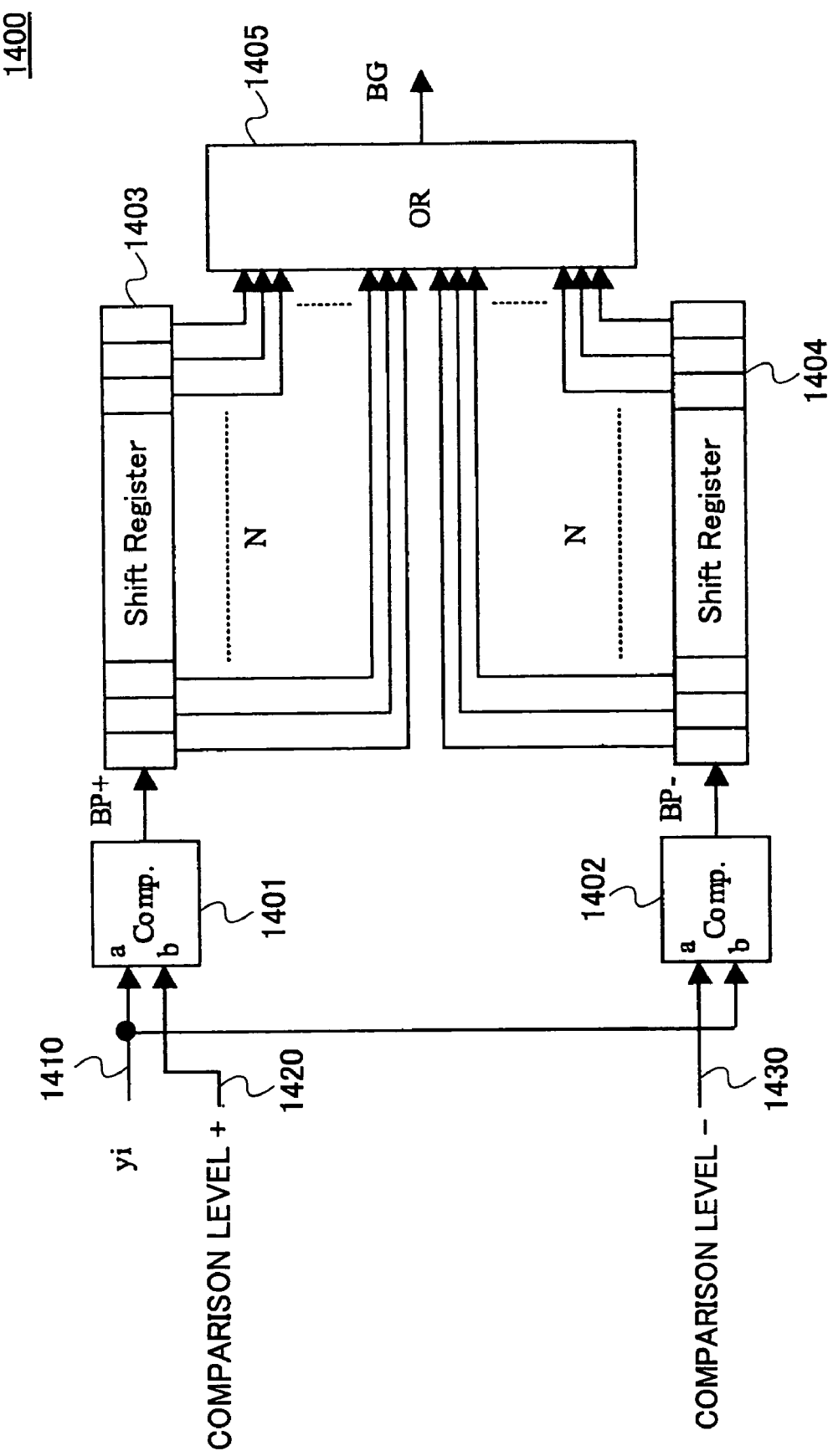
FIG. 14 is a block diagram showing an exemplary configuration of a burst error detector.

FIG. 14 is a block diagram illustrating an exemplary configuration of a burst error detection circuit that may be included in the reproducing circuit 205 shown in FIG. 13. The burst error detection circuit of FIG. 14 includes comparators 1401 and 1402, shift registers 1403 and 1404, and a logical OR gate 1405. Reproduced data $y_i$ that are input to the comparators 1401 and 1402 are compared to comparison levels 1420 and 1430, respectively, at the comparators 1401 and 1402. The comparison results are then input to the shift registers 1403 and 1404. The shift register 1403 stores comparison results in which the amount of the reproduced data $y_i$ is determined to be greater than the predetermined comparison level 1420. The shift register 1404 stores comparison results in which the amount of the reproduced data $y_i$ is determined to be less than the predetermined comparison level 1430. Then, a logical sum (OR) of the comparison results stored in the shift resisters 1403 and 1404 is calculated by the OR gate 1405, and output as a burst error detection result. By using the burst error detection circuit 1400 of FIG. 14, the occurrence of a burst error within a reproducing signal may be monitored.

When a burst error having a length that exceeds a predetermined length in units for iterative decoding is detected within the reproducing signal by the burst error detection circuit 1400, burst information is supplied to the iterative decoder 1303 and ECC decoder 207 to control the number of iterations, or a flag for indicating that the burst error be handled as lost data may be sent. In response to the flag indicating lost data, the ECC decoder 207 may conduct lost data compensation. Alternatively, instead of using the burst error detection circuit 1400, parity codes (e.g. CRC) may be added to the recording block for iterative decoding, the iterative decoder 1303 may be arranged to handle the reproducing data as lost data upon detecting data errors of more than a predetermined amount (including random errors), and the ECC decoder 207 may be arranged to process the reproduced data as lost data.

Figure 15:
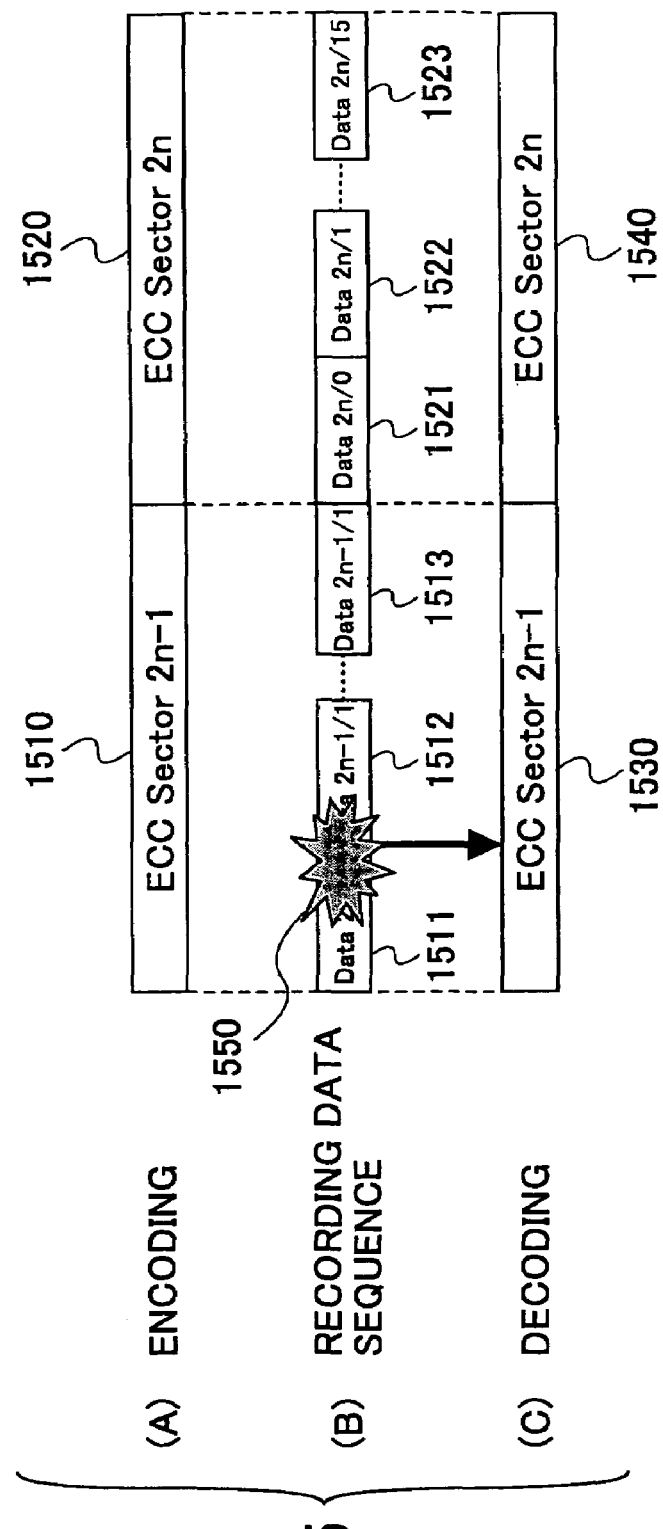
FIG. 15 is a diagram illustrating an impact of a burst error.
Figure 16:
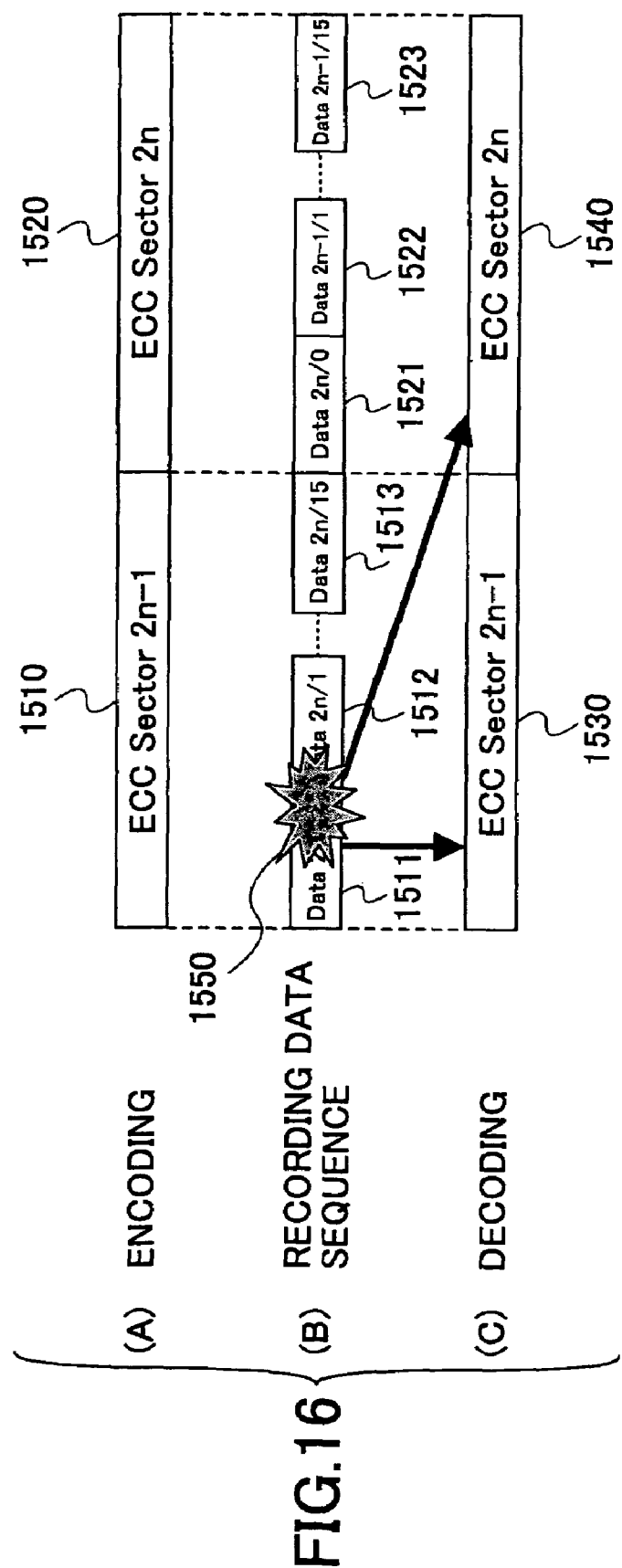
FIG. 16 is a diagram illustrating an advantageous effect realized by an embodiment of the present invention with respect to the impact of a burst error.

FIG. 15 is a diagram illustrating an exemplary impact of a burst error on data reproduction. FIG. 16 is a diagram illustrating an advantageous effect that may be realized by an embodiment of the present invention with respect to the impact of a burst error.

In FIGS. 15 and 16, part (A) shows ECC sectors 1510 and 1520 at the time of encoding, part (B) shows data blocks 1511, 1512, 1513, 1521, 1522, and 1523 of a recording data sequence, and part (C) shows ECC sectors 1530 and 1540 at the time of data decoding.

For example, in a case where the error correction capacity of the ECC allows error correction of up to 80 data units, if a burst error 1550 of 100 data units is generated across two data blocks 1511 and 1512 in the example of FIG. 15, this results in a data error of 100 data units within one ECC sector so that error correction may not be effectively realized by the ECC in the ECC sector 1530. However, as is illustrated in FIG. 16, according to an embodiment of the present invention, even when a similar burst error of 100 data units is generated across two data blocks 1511 and 1512, the two data blocks may be distributed over two differing ECC sectors 1530 and 1540 and the data error may be divided into two data error parts each amounting to 50 data units, for example, so that error correction may be effectively realized on the data error and accurate data decoding may be realized.

Figure 17:
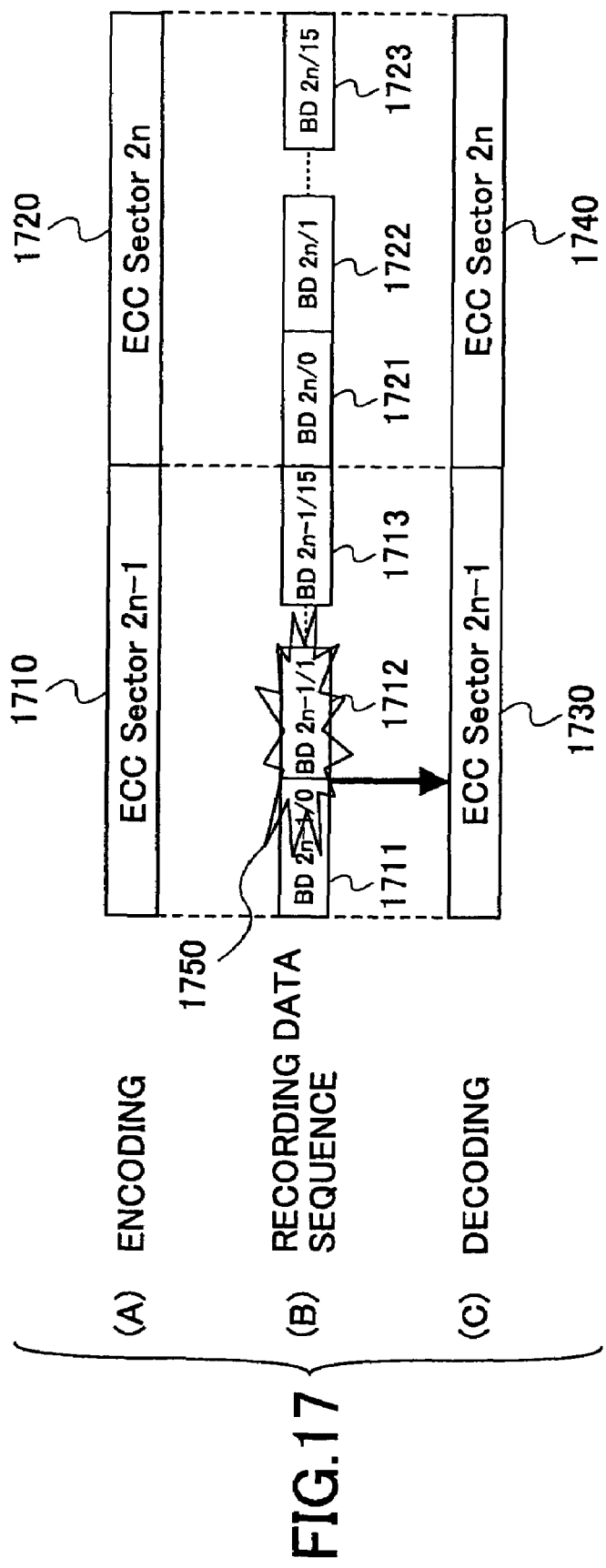
FIG. 17 is a diagram showing an impact of a burst error in a system using iterative decoding.
Figure 18:
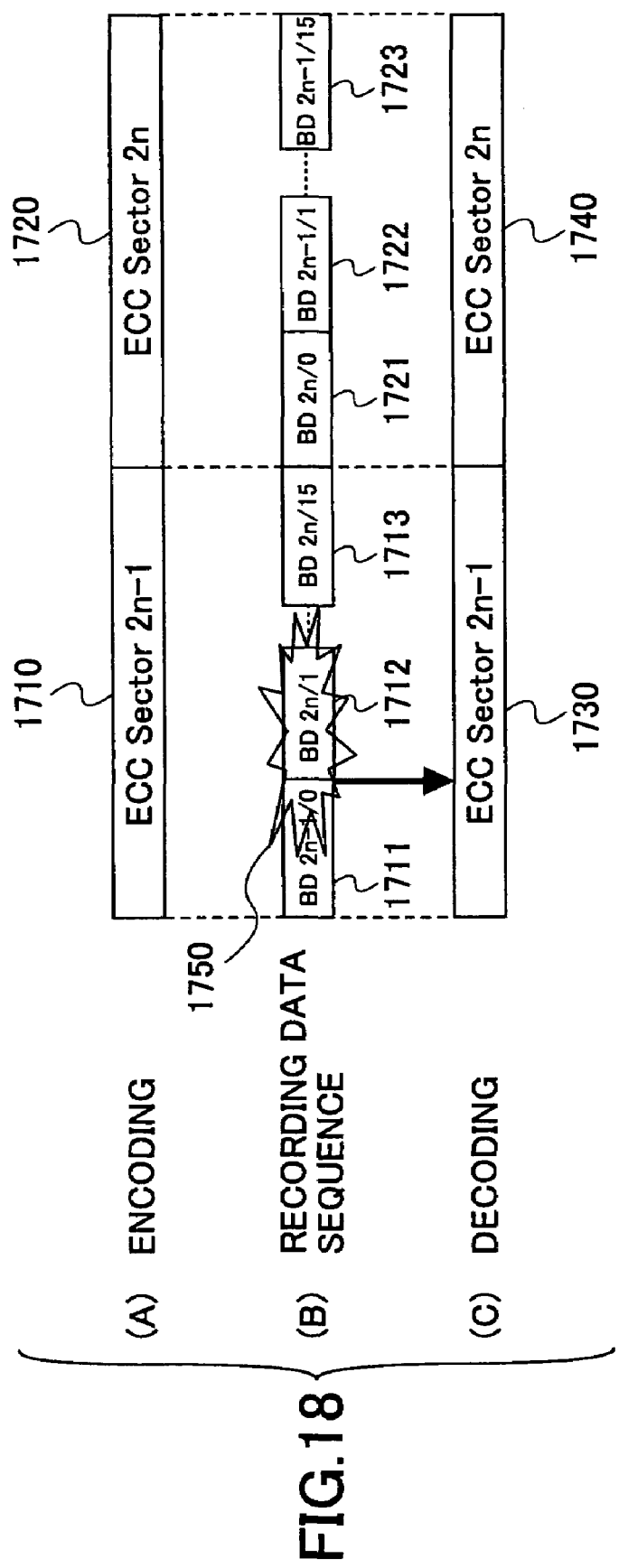
FIG. 18 is a diagram illustrating an advantageous effect realized by an embodiment of the present invention with respect to the impact of a burst error in a system using iterative decoding.

FIG. 17 illustrates an exemplary impact of a burst error on data reproduction in a system implementing iterative decoding. FIG. 18 illustrates an advantageous effect that may be realized by an embodiment of the present invention with respect to the impact of a burst error occurring in the system implementing iterative decoding.

In FIGS. 17 and 18, part (A) shows ECC sectors 1710 and 1720 at the time of data encoding, part (B) shows data blocks 1711, 1712, 1713, 1721, 1722, 1723 of a recording data sequence, and part (C) shows ECC sectors 1730 and 1740 at the time of decoding.

For example, in a case where the ECC is able to handle 5 blocks of lost data, if a burst error 1750 occurs is generated across seven iterative decoding blocks in the example shown in FIG. 17, the data in the ECC sector 1730 may not be accurately decoded. However, if the burst error is distributed over two or more ECC sectors as is shown in the example of FIG. 18, for example, the burst error may be distributed as four blocks of lost data in ECC sector 1730 and three blocks of lost data in ECC sector 1740 so that error correction may be realized by the ECC in both ECC sectors 1730 and 1740.

As the recording bit size for data recording becomes smaller due to an increase in recording density, the impact of dust particles and scratches on data reproduction becomes greater even when the size of the dust particle or the scratch itself is not changed. For example, in a system implementing a high recording density, the presence of a dust particle may result in the generation of a long burst error. However, according to an embodiment of the present invention, a data recording/reproducing system that has an enhanced error correction capacity for handling such long burst errors and thereby having a high decoding capacity may be realized without changing the ECC.

It is noted that preferred embodiments of the present invention have been described above; however the present invention is not limited to these embodiments, and variations and modifications may be made without departing from the scope of the present invention.

What is claimed is:

1. A data recording/reproducing apparatus, comprising:
   an error correction encoder configured to conduct error correction encoding on input data and generate an ECC sector including error correction encoded data that are divided into predetermined data units;
   an iterative encoder configured to conduct iterative encoding on the predetermined data units and generate an iterative encoded ECC sector including iterative encoded data units;
   a distribution unit configured to distribute the iterative encoded data units of at least two of the iterative encoded ECC sectors generated by the iterative encoder and generate interleaved ECC sector data;
   a recording unit configured to record the interleaved ECC sector data on a recording medium;
   a reproducing unit configured to reproduce the interleaved ECC sector data from the recording medium;
   a de-interleaving unit configured to de-interleave the interleaved ECC sector data reproduced by the reproducing unit;
   an iterative decoder configured to conduct iterative decoding on the de-interleaved ECC sector data output by the de-interleaving unit; and
   an error correction decoder configured to conduct error correction decoding on the iterative decoded ECC sector data output by the iterative decoder.

2. The data recording/reproducing apparatus as claimed in claim 1, wherein the iterative encoded data units of a same one of the ECC sectors are distributed in a non-consecutive order.

3. The data recording/reproducing apparatus as claimed in claim 1, further comprising:
   a memory having a data capacity for accommodating at least an amount of data of one of the ECC sectors that are to be distributed.

4. The data recording/reproducing apparatus as claimed in claim 3, wherein the iterative encoded data units are distributed by interchanging positions of odd numbered iterative encoded data units of one of the ECC sectors with positions of odd numbered iterative encoded data units of another one of the ECC sectors.

5. The data recording/reproducing apparatus as claimed in claim 4, wherein the recording unit and the reproducing unit are configured to record or reproduce at least two of the iterative encoded data units simultaneously, and distribute the iterative encoded data units of at least two of the ECC sectors.

6. The data recording/reproducing apparatus as claimed in claim 3, wherein the iterative encoded data units are distributed by interchanging positions of odd numbered iterative encoded data units of one of the ECC sectors with positions of even numbered iterative encoded data units of another one of the ECC sectors.

7. The data recording/reproducing apparatus as claimed in claim 6, wherein the recording unit and the reproducing unit are configured to record or reproduce at least two of the iterative encoded data units simultaneously, and distribute the iterative encoded data units of at least two of the ECC sectors.

8. The data recording/reproducing apparatus as claimed in claim 1, further comprising:
   a data buffer configured to monitor continuity of the input data.

9. The data recording/reproducing apparatus as claimed in claim 8, wherein when the data buffer determines that the input data continue over a data amount that is greater than or equal to a data amount for two of the ECC sectors, data of the two ECC sectors are distributed and recorded on the recording medium.

10. The data recording/reproducing apparatus as claimed in claim 8, wherein when the data buffer determines that the input data continue over a data amount that is less than or equal to a data amount for a single one of the ECC sectors, data of the single ECC sector and recorded data or dummy data are distributed and recorded.

11. The data recording/reproducing apparatus as claimed in claim 1, wherein a file allocation table is referred to for determining whether unrecorded sectors for recording data of two of the ECC sectors are available within the recording medium.

12. The data recording/reproducing apparatus as claimed in claim 11, wherein when the unrecorded sectors for recording data of two of the ECC sectors are available, data of the ECC sector generated by the input data and dummy data are used to realize the distribution.

13. The data recording/reproducing apparatus as claimed in claim 11, wherein when an unrecorded sector for recording data of one of the ECC sectors is available in the recording medium, data of one sector recorded on the recording medium are reproduced, and the reproduced data of said one sector and data of another one of the ECC sectors generated by the input data are distributed and recorded on the recording medium.

14. The data recording/reproducing apparatus as claimed in claim 1, further comprising:
   a burst error detector.

15. The data recording/reproducing apparatus as claimed in claim 14, wherein when a burst error is detected by the burst error detector, the error correction decoder processes data reproduced from the recording medium corresponding to the burst error as lost data.

16. The data recording/reproducing apparatus as claimed in claim 1, wherein the iterative encoder assigns parity codes to the iterative encoded data units, and the iterative decoder uses the parity codes to determine whether the iterative encoded data units that are reproduced from the recording medium correspond to lost data.

17. The data recording/reproducing apparatus as claimed in claim 1, wherein the distribution is realized using at least three of the ECC sectors.

18. The data recording/reproducing apparatus as claimed in claim 1, wherein the iterative encoded data units are distributed and recorded on differing tracks of the recording medium.

19. The data recording/reproducing apparatus as claimed in claim 1, wherein the interative encoded units are distributed and recorded on a fore side and a rear side of the recording medium.

20. A data recording/reproducing method, comprising:
- conducting error correction encoding on input data and generating an ECC sector including error correction encoded data that are divided into predetermined data units;
- conducting iterative encoding on the predetermined data units and generating an iterative encoded ECC sector including interative encoded data units;
- distributing the iterative encoded data units of at least two of the iterative encoded ECC sectors generated by the iterative encoding and generating interleaved ECC sector data;
- recording the interleaved ECC sector data on a recording medium;
- reproducing the interleaved ECC sector data from the recording medium;
- conducting de-interleaving to de-interleave the reproduced interleaved ECC sector data;
- conducting iterative decoding on the de-interleaved ECC sector data output by the de-interleaving; and
- conducting error correction decoding on the iterative decoded ECC sector data output by the iterative decoding.

* * * * *

UNITED STATES PATENT AND TRADEMARK OFFICE
CERTIFICATE OF CORRECTION

PATENT NO. : 7,430,702 B2 Page 1 of 1
APPLICATION NO. : 11/041248
DATED : September 30, 2008
INVENTOR(S) : Masakazu Taguchi It is certified that error appears in the above-identified patent and that said Letters Patent is hereby corrected as shown below:

Column 17, Line 9, change "interative" to --iterative--.

Column 17, Line 9, after "encoded" insert --data--.

Column 17, Line 19, change "interative" to --iterative--.

Signed and Sealed this

Sixth Day of January, 2009

JON W. DUDAS
*Director of the United States Patent and Trademark Office*